United States Patent [19]

Meysenburg

[11] 4,029,293
[45] June 14, 1977

[54] CONTROL VALVE

[75] Inventor: Raymond Richard Meysenburg, Cedar Falls, Iowa

[73] Assignee: Deere & Company, Moline, Ill.

[22] Filed: Sept. 4, 1975

[21] Appl. No.: 610,232

[52] U.S. Cl. ............................... 251/282; 251/83; 137/115

[51] Int. Cl.² ................... F16K 21/04; F16K 15/18

[58] Field of Search ............ 251/14, 20, 62, 63.4, 251/82, 83, 282, 318, 319, 320, 282; 137/495, 503, 522, 115, 119, 514.7; 303/76

[56] References Cited

UNITED STATES PATENTS

| 234,602 | 11/1880 | Moore et al. | 251/282 |
|---|---|---|---|
| 515,578 | 2/1894 | Eynon | 137/514.7 |
| 1,904,557 | 4/1933 | Standerwick | 137/522 X |
| 2,027,762 | 1/1936 | Becker | 137/503 X |
| 2,320,011 | 5/1943 | Reynolds | 251/14 X |
| 2,830,784 | 4/1958 | Placette | 251/14 |
| 3,410,304 | 11/1968 | Paul, Jr. | 251/63.4 X |
| 3,410,518 | 11/1968 | Carsten | 251/63.4 X |
| 3,478,776 | 11/1969 | Royer | 137/495 X |

Primary Examiner—William R. Cline

[57] ABSTRACT

A manually operable valve for controlling the displacement of a main pump in a hydrostatic transmission controls the quantity of fluid flow to the main pump for low speed operation of the transmission and controls the pressure of the fluid flowing to the main pump during periods of high speed operation of the transmission. The valve includes a pressure chamber acting to substantially balance forces on the valving element to obtain low-effort operation of the control plunger regardless of the position of the element and to automatically close the valve upon a failure in the control linkage for the plunger so that in the event the operator loses control of the valve through linkage failure all power to the transmission is cut off.

4 Claims, 2 Drawing Figures

CONTROL VALVE

CROSS REFERENCE TO RELATED APPLICATION

This application contains subject matter common to copending application Ser. No. 610,234, now U.S. Pat. No. 3,995,973 filed concurrently herewith and relates to improvements in the invention described and claimed in said application.

BACKGROUND OF THE INVENTION

The present invention relates generally to control valves and more particularly relates to control valves particularly adapted for controlling the displacement of a main drive pump and hydrostatic transmission.

In the above-mentioned copending application Ser. No. 610,234 there is disclosed a hydrostatic transmission which is controlled by controlling the amount and pressure of fluid at the inlet of the drive pump. The control valve disclosed therein will control the quantity of fluid flowing to the pump during periods of low speed operation of the transmission and will control the pressure of the fluid flowing to the pump during periods of high speed operation. The control valve disclosed in the aforementioned copending application provides extremely good control characteristics, but requires a varying, often high effort to move the control plunger and in the event of a failure in the mechanical control linkage for the valve, the valve can move to and remain in its fully open position so that the transmission continues to operate at high speeds.

SUMMARY OF THE INVENTION

The principal object of the present invention is to provide a control valve of the general type described above which requires a low-effort force for movement of the control plunger. This object is accomplished by subjecting the back side of the valving piston or control plunger to a fluid pressure sufficient to exert a force thereon which substantially balances other forces exerted on the valving piston by fluid pressure.

Another object of the present invention is to provide a control valve of the general type described above which automatically closes in the event of a failure in the mechanical control linkage therefor. This object is accomplished by subjecting the back side of the valving piston or control plunger to a fluid pressure sufficient to exert a force of slightly greater than any other forces exerted on the valving piston by fluid pressure.

The above and additional objects and advantages of the present invention will become apparent to those skilled in the art from a reading of the following detailed description when taken in conjunction with accompanying drawings.

DESCRIPTION OF THE PREFERRED EMBODIMENT

Figure 1:
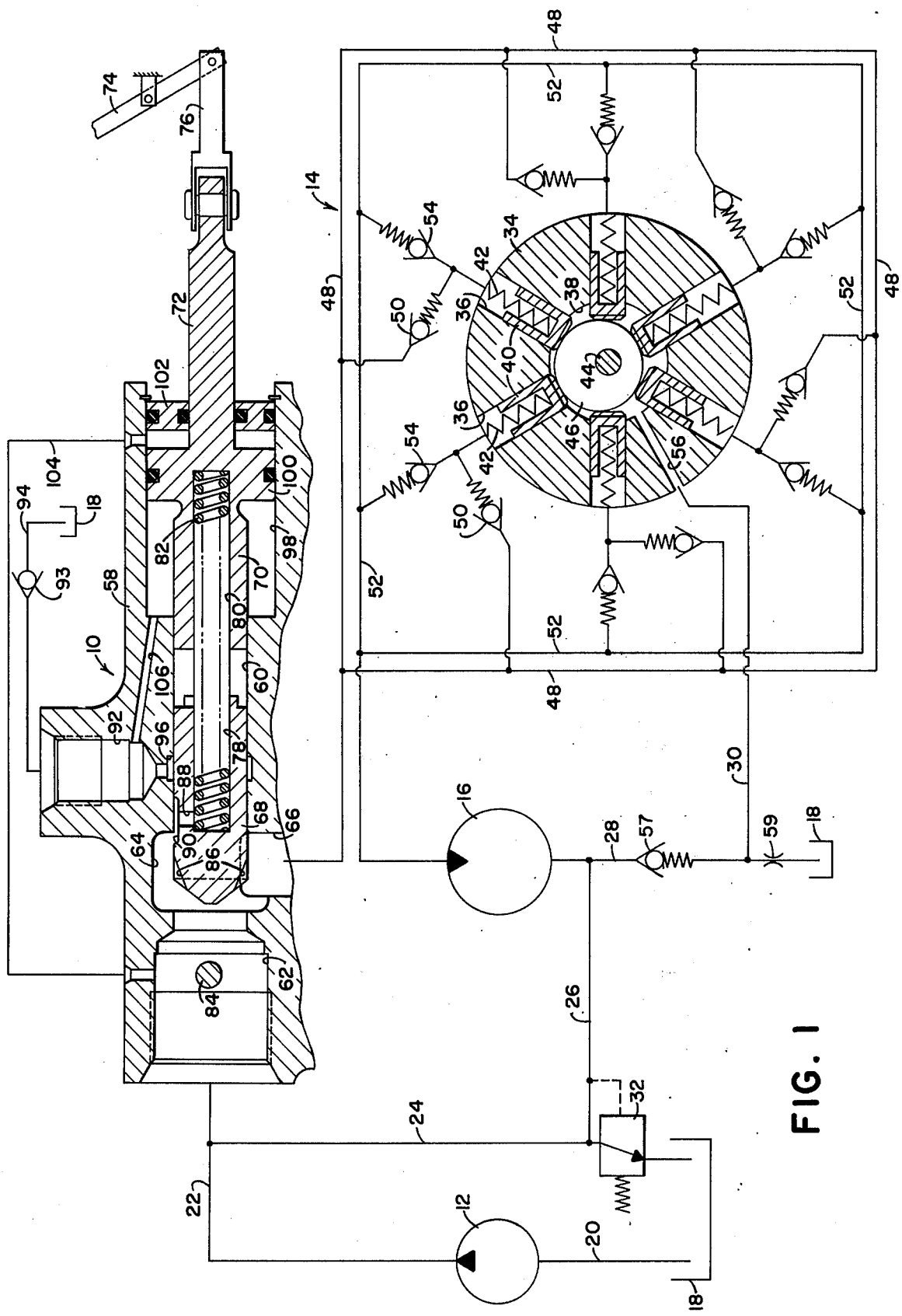
FIG. 1 is a partially schematic and partially sectional view of a hydrostatic transmission employing a control valve constructed in accordance with the principles of the present invention.

With reference to the drawings, a preferred embodiment of the improved control valve according to the present invention is indicated generally at 10 and is illustrated as a component in a hydrostatic transmission which includes a charge pump 12, a main pump 14 and a hydraulic motor 16. The charge pump 12 draws fluid from a reservoir 18 through a fluid line 20 and delivers the fluid to a charge system which includes fluid lines 22, 24, 26, 28 and 30. A relief type pressure control valve 32 is interposed in the fluid line 24 to maintain a substantially constant pressure within the charge circuit.

The main pump 14 includes a cylinder barrel 34 having a plurality of cylinders 36, each cylinder 36 having one end open to a drive chamber 38. A piston 40 is mounted within each cylinder 36, and a spring 42 in each cylinder normally biases its respective piston toward the drive chamber. A driveshaft 44 adapted to be driven by an external prime mover such as an internal combustion engine is journaled in the cylinder barrel 34 and extends through the drive chamber 38. A circular cam 46 is eccentrically mounted on the shaft 44 for rotation therewith and engages the ends of the pistons 40 within the drive chamber and forces them outwardly. Each of the cylinders 36 is connected to a pump inlet represented by the fluid line 48 through a check valve 50 and to a pump outlet represented by the fluid line 52 through a check valve 54.

The drive chamber of the pump 14 is in communication with the fluid line 30 of the charge circuit through a passage 56. A spring loaded check valve 57 is interposed in the fluid line 28, and the fluid line 28 is also connected, downstream of the check valve 57, to the reservoir 18 through a restriction 59. The check valve 57 and restriction 59 provide a pressure differential between the fluid in the lines 28 and 30 so that the fluid pressure in the drive chamber 38 is less than the pressure in the charge circuit by a predetermined amount. The fluid pressure within the drive chamber 38 and the springs 42 are matched so that, in the absence of any fluid pressure on the outer ends of the pistons, the forces exerted on each of the pistons are substantially balanced when the piston is at the inner end of its movement and the spring is compressed.

The outlet 52 of the pump 14 is connected to the inlet of the hydraulic motor 16 and the outlet of the motor 16 is connected to the fluid line 28 of the charge system. In this manner, all fluid from the pump 14 is directed to the motor 16 and back to the charge circuit 28 and the amount of fluid required from the charge pump 12 is kept at a minimum.

The control valve 10 interconnects fluid line 22 of the charge circuit and the pump inlet 48, and controls the amount and/or the pressure of the fluid flowing from the charge circuit to the pump inlet. The valve 10 includes a valve body 58 provided with a valve bore 60. One end of the valve bore 60 is provided with an enlarged area 62 forming an inlet port which is connected to the fluid line 22 of the charge circuit. Inwardly of the enlarged area 62 the valve bore is provided with a grooved or enlarged area 64 which communicates with the pump inlet 48 by way of an outlet port 66 provided in the valve body 58.

Figure 2:
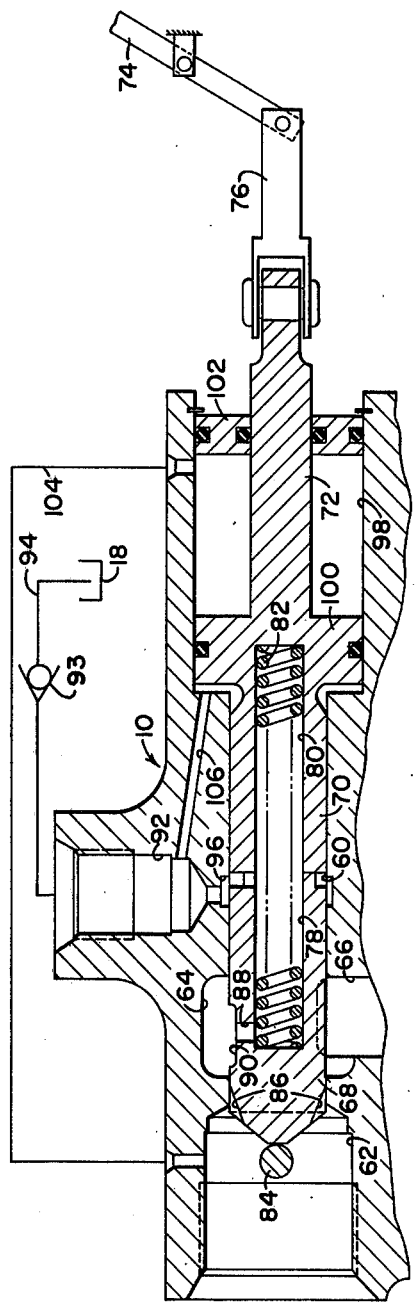
FIG. 2 is a sectional view of the control valve illustrated in FIG. 1 with the components thereof illustrated in different positions.

A valving element or valving piston means including a valving piston 68 and a control plunger 70 are slidingly and sealingly mounted within the valve bore for movement of the valving piston 68 between an extreme closed position illustrated in FIG. 2 in which it prevents communication between the enlarged areas 62 and 64 of the valve bore 60 and an extreme open or fluid passing position illustrated in FIG. 1 in which it affords communication between the enlarged areas 62 and 64 of the bore 60. The control plunger 70 is provided with an integral manual control rod 72 which extends from the end of the bore 60 remote from the enlarged area 62. The manual control rod is connected to a suitable operator control level represented by the pivoted link 74 through any suitable mechanical linkage represented by the interconnecting link 76. The valving piston 68 and control plunger 70 are constructed as separate components and are provided with facing blind bores 78 and 80. A compression spring 82 extends into the blind bores 78 and 80 and acts between the valving piston 68 and control plunger 70.

The head end of the valving piston 68 or the end facing the enlarged area 62 is tapered to provide an extension which abuts against a pin 84 when the valving piston 68 is in its fully closed position as illustrated in FIG. 2. The head end of the valving piston 68 is also provided with a pair of metering grooves 86.

The head end of the valving piston 68 in combination with the enlarged area 62 form a first servo means of first expandable pressure chamber which is responsive to fluid pressure therein to bias the valving piston 68 toward its open position. That is, fluid pressure within the enlarged area 62 constantly acts on the head end of the valving piston to move to its open position. The facing ends of the valving piston 68 and the control plunger 70 also form, in combination with the valve bore 60, a second servo means or an expandable pressure chamber which is responsive to fluid pressure therein to bias the valving piston 68 towards its closed position. The second servo means is in constant communication with the enlarged area 64 by way of the blind of the blind bore 78, a transverse opening 88 provided in the valving spool 68 and a recessed area 90 provided in the valving spool.

The valve body 58 is also provided with a drain port 92 which is connected to the reservoir 18 through a check valve 93 and a fluid line 94. The drain port 92 communicates with a bore groove 96 spaced from the enlarged area 64. As can be seen by comparing FIGS. 1 and 2, the groove 96 is located such that it is in communication with the second servo means or second expandable pressure chamber whenever the valving spool 68 is in its fully closed position and at all other times the grooves 96 is closed by the valving spool 68. With this construction, whenever the valving spool 68 is moved to its fully closed position the inlet 48 of the pump 14 is connected to the reservoir 18 so that there is no pressure therein to cause undesired pump displacement.

The end of the bore 60 remote from the enlarged area 62 is also enlarged as at 98, and the control plunger 70 is provided with an integral piston member 100 which slidably engages the walls of the enlarged area 98. A closure member 102 for the enlarged area 100 sealingly engages the walls thereof and the control rod 72 to form, in conjunction with the piston member 100, a third servo means or expandable pressure chamber which is responsive to fluid pressure to bias the plunger member 70 in a direction to move the valving means 68 to its closed position. The third servo means is in fluid communication with enlarged area 62 via a fluid line 104 so the same pressure that is applied against the head end of the valving piston 68 is applied against the piston 100. In this regard it should be noted that the effective area of the piston member 100 exposed to the fluid pressure in the third servo means may be substantially equal to the effective area of the head end of the valving piston 68 so that forces on the valving means are substantially balanced, but preferably the effective area of the piston member 100 is slightly greater than the effective area of the head end of the valving piston 68. The inner end of the enlarged area 98 is connected to the drain port 92 by a fluid passage 106. The passage 106 provides for the exhaust of any fluid which may have leaked across the plunger to the inner end of the enlarged area 98.

The operation of the valve 10 and the disclosed hydrostatic transmission is basically the same as the operation of the transmission disclosed in the aforementioned copending application Ser. No. 610,234. That is, the displacement of the main pump 14 in under complete control of the valve 10. As an operator moves the plunger 70 to the right from the position illustrated in FIG. 2 by manipulation of the lever 74, the metering ports 86 will open and control the amount of fluid flowing to the pump 14. The pressure of the fluid flowing to the main pump 14 is also applied to the second servo means and acts against the valving piston 68 to bias the valving piston 68 toward the closed position. Upon continued movement of the control plunger 70 to the right the valve will continue to open and control the quantity of fluid flowing to the main pump 14. However, as soon as the pressure drop across the valve has decreased sufficiently so that the force exerted on the valving piston 68 by fluid pressure delivered to the pump 14 plus the force exerted on the valving piston 68 by the spring 82 equals the force exerted on the head end of the valving piston 68 by fluid pressure within the enlarged area 62, the valve 10 begins to control the pressure of the fluid flowing to the main pump 14. As more fully explained in the above-mentioned copending application, this provides good control of pump flow or output during periods of low speed operation of the transmission and yet during high speed periods of operation of the transmission the pump 14 is sensitive to engine speed.

The fluid pressure within the third servo means provides a force on the valving means which substantially balances the force exerted on the valving means by fluid pressure within the first servo means so a low-effort force is required to move the control lever 74. Also, with the effective area of the third servo means slightly greater than the effective area of the first servo means, a failure in the mechanical linkage for the control rod 72, such as failure of the pin connecting the operator control lever 74 and the connecting link 76 or the pin connecting the connecting link 76 to the control rod 72, will result in the fluid pressure within the third servo means immediately moving the valving piston 68 to and maintaining the same in its closed position so that the transmission is, in effect, in neutral. Thus, the control valve according to the present invention is an improvement over the control valve illustrated in the above-mentioned copending application inasmuch as it provides for a low-effort force for manual control and automatically closes in response to linkage failure whereas the control valve in the above-mentioned copending application automatically moves to a fully open position in response to a mechanical failure.

Having thus described a single preferred embodiment of the invention various modifications within the spirit and scope of the invention will become apparent to those skilled in the art and can be made without departing from the underlying principles of the invention. Therefore, the invention should not be limited to the specific illustration and description of a single preferred embodiment, but should be limited only by the following claims.

I claim:

1. A pump displacement control valve comprising: a valve body having a valve bore therein; an inlet port in the valve body in communication with one end of the valve bore and adapted to be connected to a substantially constant pressure source of fluid; an outlet port in the valve body in communication with the bore intermediate the ends thereof and adapted to be connected to a pump inlet; a valving piston slidably mounted in the valve bore for movement between fluid blocking and fluid passing positions; one end of the valving piston forming in combination with the one end of the valve bore first servo means responsive to fluid pressure therein to bias the valving piston toward its fluid passing position; plunger means slidably mounted in the valve bore adjacent the second end thereof; the second end of the valving piston forming in combination with the valve bore and plunger means second servo means responsive to fluid pressure to bias the valving piston toward its fluid blocking position; means providing fluid communication between the outlet port and the second servo means; said plunger means including a manually operable control rod extending from the one end of the valve bore affording manual positioning of the plunger means; compression spring means in the valve bore between the valving piston and plunger means and acting on the valving means to bias the same toward its fluid blocking position with a force dependent on the position of the plunger means; third servo means responsive to fluid pressure therein to bias the plunger means toward the valving means; and means providing fluid communication between the first and third servo means.

2. A control valve as set forth in claim 1 wherein the effective area of the third servo means is greater than the effective area of the first servo means whereby, in the absence of an external force on the control rod the valving means will be moved to its closed position by fluid pressure in the third servo means acting through the plunger means.

3. A control valve as set forth in claim 2 wherein the compression spring means extends into a blind bore provided in at least one of the valving piston and plunger means, and the maximum force exerted by the compression spring means on the valving means is less than the force exerted on the valving means by the first servo means.

4. A control valve as set forth in claim 2 wherein the third servo means is formed by an enlarged area adjacent the second end of the valve bore, piston means integral with the plunger means slidable within the enlarged area, and closure means for the second end of the valve bore sealingly engaging the walls of the bore and the control rod.

* * * * *